United States Patent
Toguchi et al.

(10) Patent No.: US 7,203,370 B2
(45) Date of Patent: Apr. 10, 2007

(54) IMAGE PROCESSING APPARATUS WHICH RECORDS IMAGES IN A COMPRESSED STATE AND OUTPUTS COMPRESSED IMAGES IN AN EXPANDED STATE

(75) Inventors: Akira Toguchi, Osaka (JP); Satoshi Tanaka, Kyoto (JP); Yukio Sugimura, Osaka (JP); Tetsuro Yabumoto, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 634 days.

(21) Appl. No.: 10/301,238

(22) Filed: Nov. 21, 2002

(65) Prior Publication Data

US 2003/0095713 A1    May 22, 2003

(30) Foreign Application Priority Data

Nov. 22, 2001    (JP)    ............................. 2001-356948

(51) Int. Cl.
G06K 9/36 (2006.01)
G06K 9/46 (2006.01)
G05B 19/18 (2006.01)

(52) U.S. Cl. ...................... 382/239; 382/234; 382/233; 382/173; 700/2; 700/4; 700/9

(58) Field of Classification Search ................. 382/239
See application file for complete search history.

(56) References Cited

U.S. PATENT DOCUMENTS

| | | | | |
|---|---|---|---|---|
| 5,402,248 A | * | 3/1995 | Sato et al. ................. 382/234 |
| 5,832,126 A | * | 11/1998 | Tanaka ........................ 382/239 |
| 5,909,548 A | * | 6/1999 | Klein et al. ................. 709/217 |
| 5,991,515 A | * | 11/1999 | Fall et al. .................. 358/1.15 |
| 6,011,901 A | * | 1/2000 | Kirsten ........................ 386/123 |
| 6,314,137 B1 | * | 11/2001 | Ono et al. ................... 375/240 |
| 6,330,025 B1 | * | 12/2001 | Arazi et al. ................. 348/143 |
| 6,421,080 B1 | * | 7/2002 | Lambert ..................... 348/143 |
| 6,456,321 B1 | * | 9/2002 | Ito et al. ..................... 348/143 |
| 6,587,735 B1 | * | 7/2003 | Yaguchi ........................ 700/2 |
| 6,747,554 B1 | * | 6/2004 | Higashimura et al. ...... 340/506 |
| 6,842,540 B1 | * | 1/2005 | Okayama et al. ........... 382/246 |

* cited by examiner

Primary Examiner—Wenpeng Chen
Assistant Examiner—Yuzhen Ge
(74) Attorney, Agent, or Firm—Gerald T. Bodner (57) ABSTRACT

An image signal processing apparatus includes two JPEG codecs. A plurality of frames of image signals periodically input from a multiplexer are individually compressed by the two JPEG codecs, and the compressed image signals are recorded on a hard disk by an HDD. Furthermore, the plurality of frames of the compressed image signals reproduced from the hard disk are individually expanded by the two JPEG codecs, and the expanded image signals are output to a monitor. Herein, each of the JPEG codecs selectively executes individual compression of the plurality of frames of the image signals and individual expansion of the plurality of frames of the compressed image signals. A CPU makes the JPEG codecs perform the compression process prior to the expansion process.

8 Claims, 6 Drawing Sheets

| CODEC OCCUPATION FLAG | COMPRESSION PROCESS | EXPANSION PROCESS |
|---|---|---|
| SET | PARALLEL COMPRESSION | WAITING STATE |
| RESET | SINGLE COMPRESSION | SINGLE EXPANSION |
| RESET | -- | PARALLEL EXPANSION |

IMAGE PROCESSING APPARATUS WHICH RECORDS IMAGES IN A COMPRESSED STATE AND OUTPUTS COMPRESSED IMAGES IN AN EXPANDED STATE

BACKGROUND OF THE INVENTION

1. Field of the Invention

The present invention relates to an image signal processing apparatus applied to a surveillance camera system, for example. More specifically, the present invention relates to an image signal processing apparatus for performing in parallel individual compression of a plurality of image signals and individual expansion of a plurality of compressed image signals.

2. Description of the Prior Art

In conventional such a kind of image signal processing apparatus, when recording is instructed, image signals sequentially fetched from a surveillance camera are individually compressed by a JPEG format and then, compressed image signals are recorded onto a recording medium. Furthermore, when reproducing is instructed, the compressed image signals sequentially read from the recording medium are individually expanded by the JPEG format so as to output expanded image signals on a monitor.

However, a conventional recording medium is a tape medium such as a video tape and is not designated on the assumption that a recording instruction and a reproducing instruction are simultaneously applied and therefore, compression processing and expansion processing are never simultaneously executed. On the other hand, recently, a disk medium such as a hard disk comes into wide use as a recording medium so as to desire parallel processing between compression and expansion. Herein, a frame lacking occurring to reproduced expanded signals due to delay of processing becomes insignificant while a frame lacking occurring to recorded compressed image signals should be avoided for the sake of a recording property.

SUMMARY OF THE INVENTION

Therefore, it is a primary object of the present invention to provide an image signal processing apparatus capable of executing compression/expansion in parallel and preventing compressed image signals from a frame lacking.

According to the present invention, an image signal processing apparatus for recording onto a recording medium in a compressed state a plurality of screens of image signals periodically input at every first number of screens and periodically outputting the plurality of screens of compressed image signals reproduced from the recording medium in an expanded state at every second number of screens, comprises: at least one codec for selectively executing a compression process for individually compressing the plurality of screens of image signals and an expansion process for individually expanding the plurality of screens of compressed image signals; and a processor for making the codec perform the compression process prior to the expansion process.

The plurality of screens of image signals periodically input by a first number of screens are recorded onto the recording medium in the compressed state. Furthermore, the plurality of screen of the compressed image signals reproduced from the recording medium are periodically output at every two screens in the expanded state. The codec selectively executes the compression process for individually compressing the plurality of screens of image signals and the expansion process for individually expanding the plurality of screens of compressed image signals. The processor makes the codec perform the compression process prior to the expansion process.

The plurality of screens of image signals are individually subjected to the compression process, and the plurality of screens of compressed image signals are individually subjected to the expansion process. Therefore, even if the compression process for successive two screens of image signals is interrupted by the expansion process, the compressed image signals are never disturbed due to this interruption. Similarly, the expansion process for successive two screens of compressed image signals is interrupted by the compression process, the expanded image signals are never disturbed due to this interruption. In addition, the compression process is executed prior to the expansion process so as not to cause a frame lacking on the compressed image signals to be recorded due to delay of time. Thus, it is possible to realize prevention of a frame lacking on the compressed image signals and parallel execution of compression/expansion.

It is preferable that the processor repeatedly requires the codec to perform the compression process on the same image signal until a size condition is satisfied. The reason why the image signal is compressed up to a size satisfying the size condition is for facilitating capacity management of a recording medium. It is noted that repeated requests for a compression process of the same image signal cause a time delay. In such the case, an advantage caused by performing the compression process prior to the expansion process conspicuously appears.

In a case a plurality of codecs exist, the processor determines whether or not the input image signal satisfies a predetermined condition. Where the predetermined condition is satisfied, all the codecs is occupied for the purpose of the compression process, and where the predetermined condition is not satisfied, at least one code is released for the purpose of the expansion process.

A plurality of codecs are prepared so as not to cause a time delay as little as possible. Then, a plurality of codecs are occupied or a part of the codec is released depending on the situation such that the compression process is executed prior to the expansion process.

Herein, the predetermined condition includes a first condition that a plurality of screens are waiting for the compression process in the memory.

A second condition that image signals are greatly changed between the screens may be included in the predetermined condition in place of the first condition or together with the first condition.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
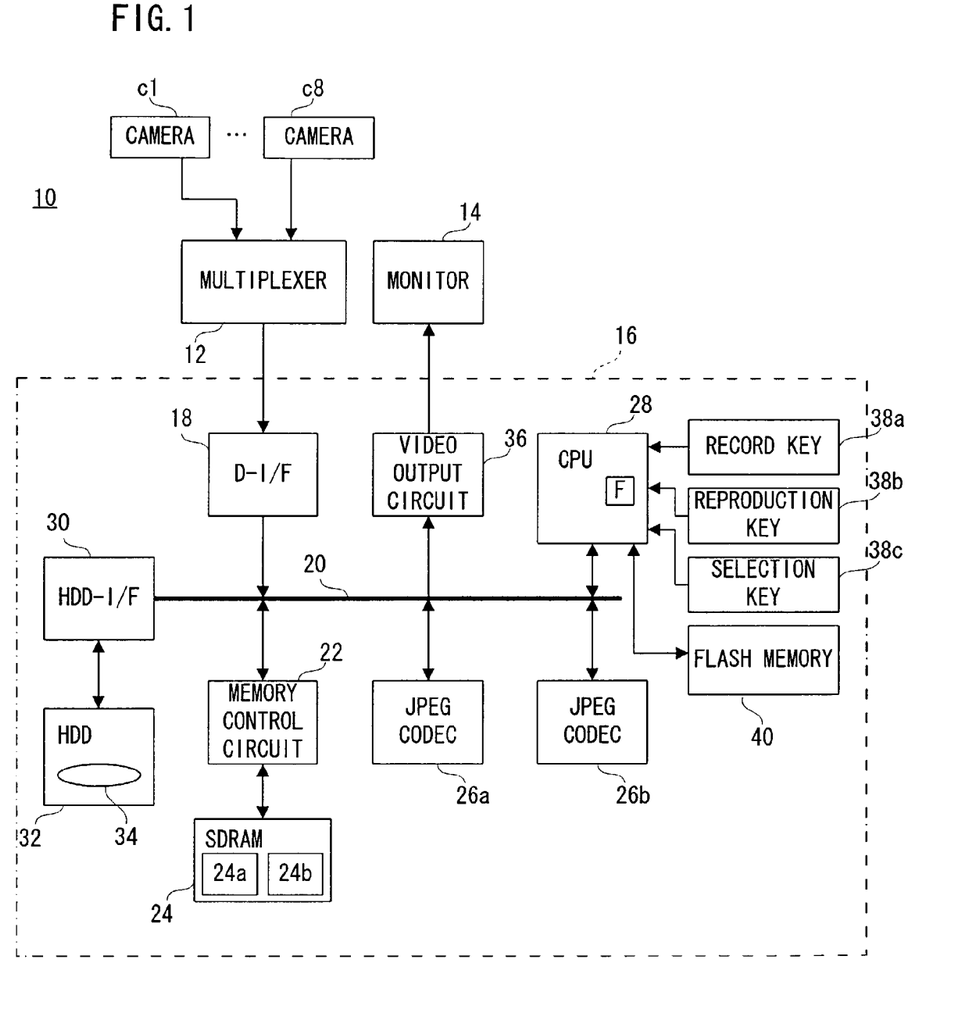
FIG. 1 is a block diagram showing one embodiment of the present invention.

Referring to FIG. 1, a surveillance camera system 10 of this embodiment is formed by a plurality of surveillance cameras c1 to c8, a multiplexer 12, a monitor 14 and a hard disk recorder 16. The surveillance cameras c1 to c8 are provided at separate places, and objects largely different with each other are photographed by the surveillance cameras c1 to c8. The multiplexer 12 selects asynchronous image signals output from the surveillance cameras c1 to c8 frame by frame and applies the selected image signals (time-division multiplex image signal) to the hard disk recorder 16.

When a record key 38a is operated, a CPU 28 instructs a D-I/F 18 to fetch the image signals. The D-I/F 18 sequentially fetches the image signals of respective frames from the multiplexer 12, and applies the fetched image signals to a memory control circuit 22 via a bus 20. The image signals are written into an SDRAM 24 by the memory control circuit 22.

Figure 2:
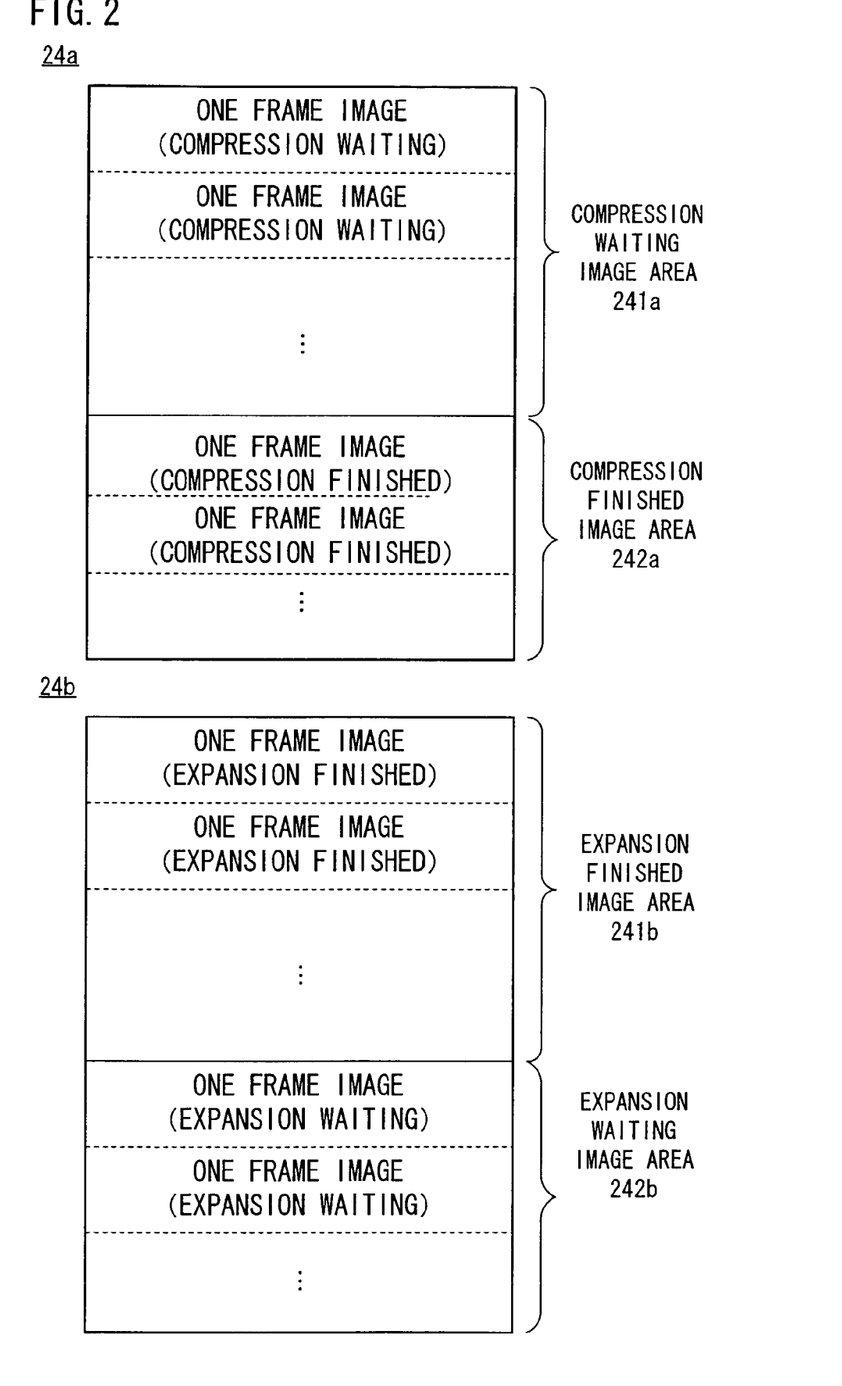
FIG. 2 is an illustrative view showing one example of a mapping state of an SDRAM.

The SDRAM 24 is formed with a record image area 24a and a reproduction image area 24b as shown in FIG. 2. Furthermore, the record image area 24a is divided into a compression waiting image area 241a and a compression finished image area 242a, and the reproduction image area 24b is divided into an expansion finished image area 241b and an expansion waiting image area 242b. The image signals input from the multiplexer 12 are stored in the compression waiting image area 241a.

Furthermore, the CPU 28 applies a compression instruction to one or both of JPEG codecs 26a and 26b in compliance with states of JPEG codecs 26a and 26b and a state of a codec occupation flag F. When only one of the JPEG codecs 26a and 26b is available, or if the codec occupation flag F is in a reset state even though both of the JPEG codecs 26a and 26b are available, the CPU 28 applies a compression instruction to one of the JPEG codecs (available JPEG codec) so as to perform a single compression process. On the other hand, when both the JPEG codecs 26a and 26b are in an available state and the codec occupation flag F is in a set state, a compression instruction is applied to both of the JPEG codecs 26a and 26b so as to perform a parallel compression process. The compression instruction includes a Q factor to define a compression ratio of an image signal and whereby, a size of the compressed image signal is determined. It is noted that set/reset of the codec occupation flag F will be described later.

When the JPEG codec 26a receives the compression instruction for the purpose of the single compression process, the JPEG codec 26a requires the memory control circuit 22 to read an image signal of a noticed frame, fetches via a bus 20 the image signal read from the compression waiting image area 241a shown in FIG. 2 by the memory control circuit 22 and compresses the fetched image signal on the basis of the Q factor. The compression processing is performed according to a JPEG format. When a compressed image signal is obtained, the JPEG codec 26a requires the memory control circuit 22 to write the compressed image signal. The compressed image signal is stored in the compression finished image area 242a shown in FIG. 2 by the memory control circuit 22.

In a case both of the JPEG codecs 26a and 26b receive a compression instruction for parallel compression processing, each of the JPEG codecs 26a and 26b requires the memory control circuit 22 to read the image signal of the same frame and fetches via a bus 20 the image signal of the same frame read by the memory control circuit 22. The respective JPEG codecs 26a and 26b are applied with the compression instructions each of which is different in Q factor, and therefore, the JPEG codecs 26a and 26b generate compressed image signals different in size with each other. Each of the generated compressed image signals is applied to the memory control circuit 22 together with a writing request and written to the compression finished image area 242a shown in FIG. 2 by the memory control circuit 22.

When the single compression processing or the parallel compression processing is completed, the CPU 28 determines whether or not the compressed image signal of the noticed frame stored in the SDRAM 24 satisfies a predetermined size condition. If the size condition is not satisfied, a compression process is performed again on the image signal of the noticed frame. Also at this time, the compression instruction is applied to one or both of the JPEG codecs 26a and 26b in accordance with states of the JPEG codecs 26a and 26b and a state of the codec occupation flag F.

It is noted that the each of the JPEG codecs 26a and 26b can execute the compression process three times per one frame period.

When the compressed image signal satisfying the size condition is obtained as to the noticed frame, the CPU 28 performs a recording process of the compressed image signal. More specifically, the CPU 28 applies a recording instruction to an HDD-I/F 30. The HDD-I/F 30 requires the memory control circuit 22 to read a desired compressed image signal and applies to an HDD 32 the compressed image signal read from the compression finished image area 242a by the memory control circuit 22. The compressed image signal is recorded onto a hard disk 34 in a file format by the HDD 32. A compressed image file is managed every surveillance camera in a photographing order within the hard disk 34.

When a desired surveillance camera is selected by a selection key 38c and a reproduction key 38b is operated, the CPU 28 instructs the HDD-I/F 30 to reproduce a compressed image file corresponding to the selected surveillance camera. The HDD-I/F 30 controls the HDD 32 so that, the compressed image signals of the object photographed by the desired surveillance camera are sequentially read from the hard disk 34. A series of read compressed image signals is applied to the memory control circuit 22 together with a writing request and written to the expansion waiting image area 242b shown in FIG. 2 by the memory control circuit 22.

The CPU 28, when the codec occupation flag F is in the reset state, applies an expansion instruction to one or both of the JPEG codecs 26a and 26b. More specifically, when only one frame of the compressed image signal is waiting in the expansion waiting image area 242b, or only one of the JPEG codecs 26a and 26b is in the available state, an expansion instruction is applied to the only JPEG codec in the available state so as to perform a single expansion process. On the other hand, when a plurality of frames of the compressed image signals are waiting in the expansion waiting area 24b and both of the JPEG codecs 26a and 26b are in the available state, expansion of the compressed image signals of successive two frames are instructed to the JPEG codecs 26a and 26b in order to perform a parallel expansion process.

The JPEG codec receiving the expansion instruction requires the memory control circuit 22 to read the compressed image signal of the noticed frame, fetches the compressed image signal read from the compression waiting area 241a by the memory control circuit 22 and expands the fetched compressed image signal in accordance with the JPEG format. The expanded image signal is applied to the memory control circuit 22 together with a writing request and written to the expansion finished image area 241b shown in FIG. 2 by the memory control circuit 22. When the parallel expansion process is executed, the successive two frames of expanded image signals are simultaneously written to the expansion finished image area 241b.

When the codec occupation flag F is in the set state, the CPU 28 waits issue of an expansion instruction until it is switched from the set state to the reset state. When a waiting time reaches a predetermined time period, the CPU 28 gives up the expansion of the compressed image signal of the noticed frame and expands a compressed image signal of a next frame. It is noted that each of the JPEG codecs 26a and 26b have an ability to perform the expansion process three times per one frame period.

The CPU 28 furthermore applies a processing instruction to a vide output circuit 36. The video output circuit 36 outputs a reading request to the memory control circuit 22 every one frame period and encodes the expanded image signals sequentially read from the expansion finished image area 241b into composite image signals. The encoded composite image signals are applied to the monitor 14, and consequently, a motion image of the object photographed by a desired surveillance camera is displayed.

Figure 3:
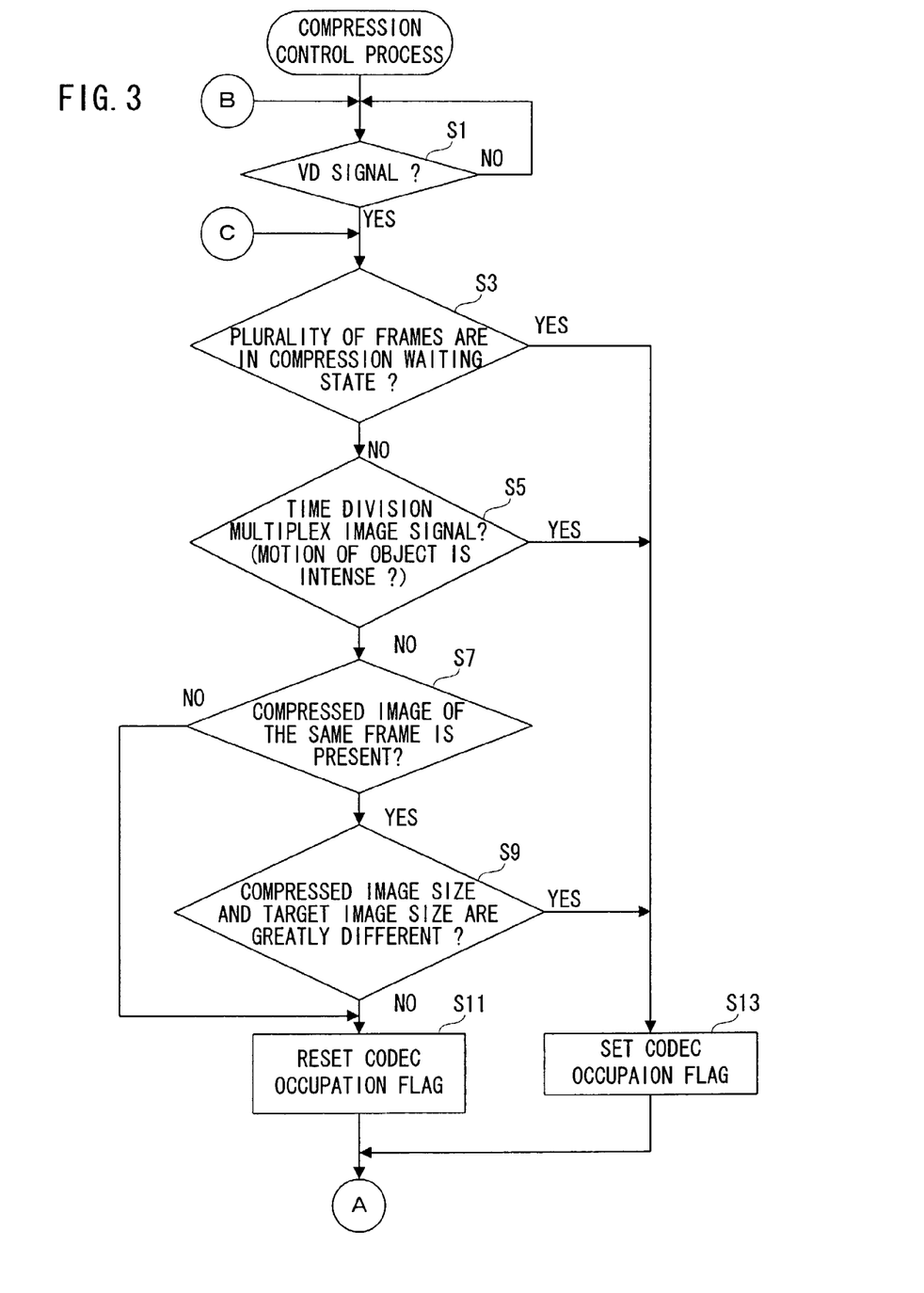
FIG. 3 is a flowchart showing one part of an operation of FIG. 1 embodiment.
Figure 4:
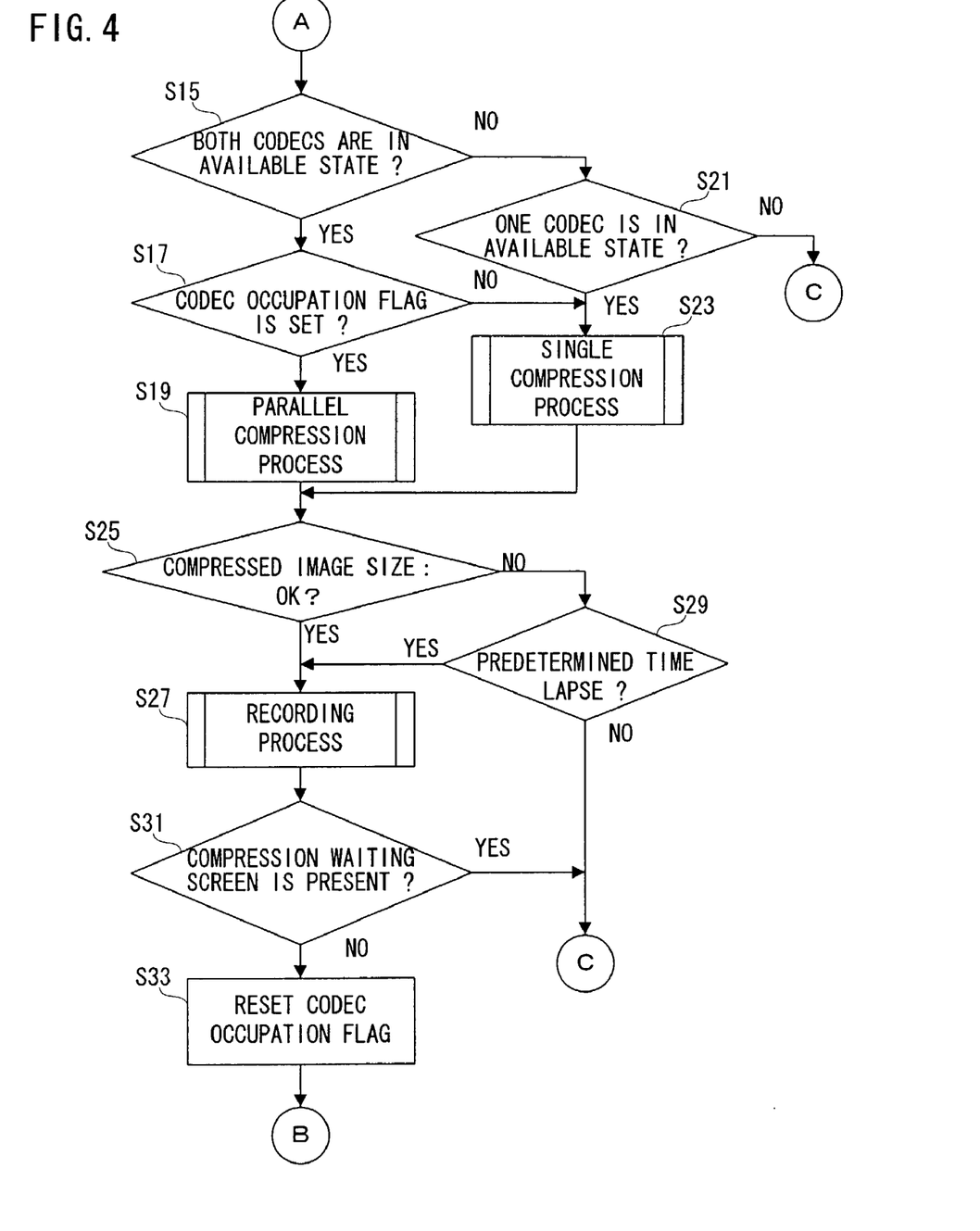
FIG. 4 is a flowchart showing another part of the operation of FIG. 1 embodiment.
Figure 5:
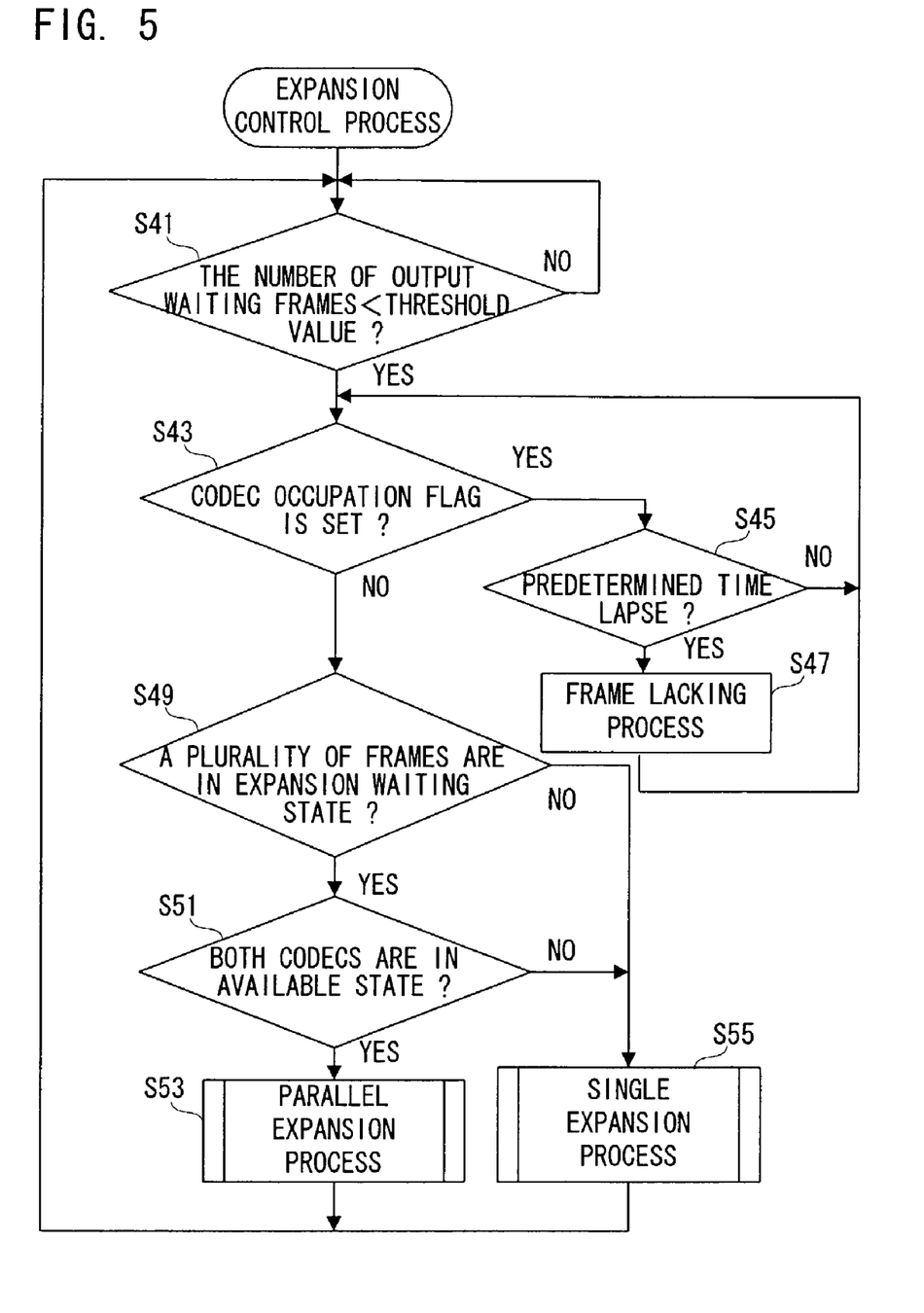
FIG. 5 is a flowchart showing the other part of the operation of FIG. 1 embodiment.

The CPU 28 is a multi-task CPU installed with a real time OS such as a μI TRON and executes in parallel compression control processing according to flowcharts shown in FIG. 3 and FIG. 4 and expansion control processing according to a flowchart shown in FIG. 5. It is noted that control programs corresponding to such the flowcharts are stored in a flash memory 40.

In the compression control process, it is determined whether or not a VD signal is generated in a step S1 shown in FIG. 3. The VD signal is output every one frame period from the D-I/F 18, and when the VD signal is generated, "YES" is determined in the step S1.

It is determined whether or not a plurality of frames of compressed image signals are waiting in the compression waiting image area 241a shown in FIG. 2 in a step S3. Furthermore, an input manner or an intensity of movement of the image signals input from the multiplexer 12 is determined in a step S5. A compressed image signal of the same frame as a noticed frame has been stored in the expansion waiting area 242b shown in FIG. 2 in a step S7. It is determined whether or not a size of the compressed image signal stored in the expansion waiting area 242b is greatly different from the target size in a step S9.

If a plurality of frames of image signals are in a compression waiting state, "YES" is determined in the step S3, and the codec occupation flag F is set in a step S13. That is, in a case a plurality of frames of image signals are in the compression waiting state, it is regarded a time delay occurs in the processing, and the codec occupation flag F is set so as to perform a parallel compression process.

Even if only one frame of image signal is in the compression waiting state, in a case the image signal input from the multiplexer 12 is a time-division multiplex image signal or the movement of the object between frames is intense, "YES" is determined in the step S5 and then, the codec occupation flag F is set in the step S13. "YES" is determined in the step S5 when the object changes greatly between the frames. In such the case, it is considered that times of compression processing required to satisfy the size condition increases, so that the codec occupation flag F is set so as to perform the parallel compression process.

It is noted that the D-I/F 18 generates different identifying signals depending on whether or not an output of the multiplexer 12 is a time-division multiplex image signal. The D-IF 18 furthermore, when the image signals of the object photographed by only one surveillance camera are output from the multiplexer 12, detects a magnitude of motion of the object between the frames, and when the magnitude of the motion exceeds a threshold value, generates a motion detection signal. The determination process in the step S5 is made on the basis of such the identifying signal and/or motion detection signal.

When the compressed image signal of the same frame has already existed in the SDRAM 24 and the size of the compressed image signal is deviated from the target size, "YES" is determined in the step S9, and then, the codec occupation flag F is set in the step S13. That is, when the compressed image size is greatly different from the target size, it is considered that a plurality of times of compression processes are needed until the size condition is satisfied, and therefore, the codec occupation flag F is set so as to perform the parallel compression process.

"NO" is determined in the step S7 when only one frame of the image signal is in the compression waiting state, the image signal is not greatly changed, and the compression process of the noticed frame is not performed at all. Furthermore, "NO" is determined in the step S9 when only one frame of the image signal is in the compression waiting state, the image signal is not greatly changed, the compression process of the noticed frame is performed at least once while the size of the compressed image signal obtained by the compression process is not so different from the target size. In such a case, it is regarded that the single compression process will do in time, so that the codec occupation flag F is reset in a step S11.

After completion of process in the step S11 or the step S13, it is determined whether or not the JPEG codecs 26a and 26b are in the available state in a step S15 or in a step S21. If one of the JPEG codecs 26a and 26b is in the available state, "YES" is determined in the step S21 and then, the single compression process is performed in a step S23. On the other hand, if both of the JPEG codecs 26a and 26b are in the available state, it is determined whether the codec occupation flag F is set or reset in a step S17. If in the reset state, the process shifts to the single compression processing in the step S23, and if in the set state, the process shifts to the parallel compression process in a step S19.

After completion of the single compression process or the parallel compression process, the process proceeds to a step S25, and then, it is determined whether or not the size of the compressed image signal reserved in the compression finished image area 242a by the current compression process satisfies the size condition. More specifically, it is determined whether or not the compressed image size falls within the target size ±α. If the size condition is satisfied, the process proceeds to a step S27 so as to perform a recording process of the compressed image signal. On the other hand, if the size condition is not satisfied, a time period being spent on the compression process of the noticed frame is determined in a step S29. If the determined time period is within a predetermined time period, it is regarded that re-compression of the noticed frame is possible and then, the processing after the step S3 is repeated. On the other hand, if the determined time period exceeds the predetermined time period, the process shifts to the step S27 so as to forcedly record a compressed image signal not satisfying the size condition.

It is noted that when the parallel compression process is performed in the step S19, condition determination in the step S25 is performed on two compressed image signals thus obtained, and as long as one of the compressed image signals satisfies the size condition, the process shifts to the step S27.

It is determined whether or not at least one frame of image signal is waiting in the compression waiting image area 241a in a step S31. If "YES" is determined, the process returns to the step S3. On the other hand, if all image signals stored in the compression waiting image area 241a are compressed to a size satisfying the size condition, and the number of frames of the image signals in the compression waiting state becomes zero, "NO" is determined in the step S31. Then, the codec occupation flag F is reset in a step S33, and the process returns to the step S1. At this time, the compression control process is substantially interrupted until the next VD signal is generated.

Referring to FIG. 5, in the expansion control process, the number of frames of expanded image signals being accumulated in the expansion finished image area 241b and being in an output waiting state is compared with a threshold value in a step S41. If the number of frames<threshold value is satisfied, it is regarded that a vacant capacity is reserved in the expansion finished image area 241b, and then, it is determined whether the codec occupation flag F is in the set state or the reset state in a step S43. If the codec occupation flag F is in the set state, the process proceeds to a step S45, and then, it is determined whether or not a time period incapable of instructing the expansion of a noticed frame exceeds a predetermined time period. If it falls within the predetermined time period, the process returns from the step S43 to the step S45 so as to wait the reset of the codec occupation flag F. If the predetermined time period lapses, a frame lacking process is performed in a step S47 and then, the process returns to the step S43. The noticed frame is renewed to a next frame by the frame lacking process.

If the codec occupation flag F is reset, the process proceeds from the step S43 to a step S49 so as to determine the number of frames of the compressed image signals waiting in the expansion waiting area 242b. When the only one frame of the compressed image signal is in the expansion waiting state, the process proceeds to a step S55 so as to perform a single expansion process. Furthermore, if only one of the JPEG codecs 26a and 26b is in the available state, even though a plurality of frames of compressed image signals are in the expansion waiting state, "NO" is determined in a step S51, and then, the process proceeds to the single expansion process in the step S55. If a plurality of compressed image signals are in the expansion waiting state and both of the JPEG codecs 26a and 26b are in the available state, "YES" is determined in the step S51 and then, the parallel expansion process is performed in a step S53. After completion of the process of the step S53 or the step S55, the process returns to the step S41.

Figure 6:
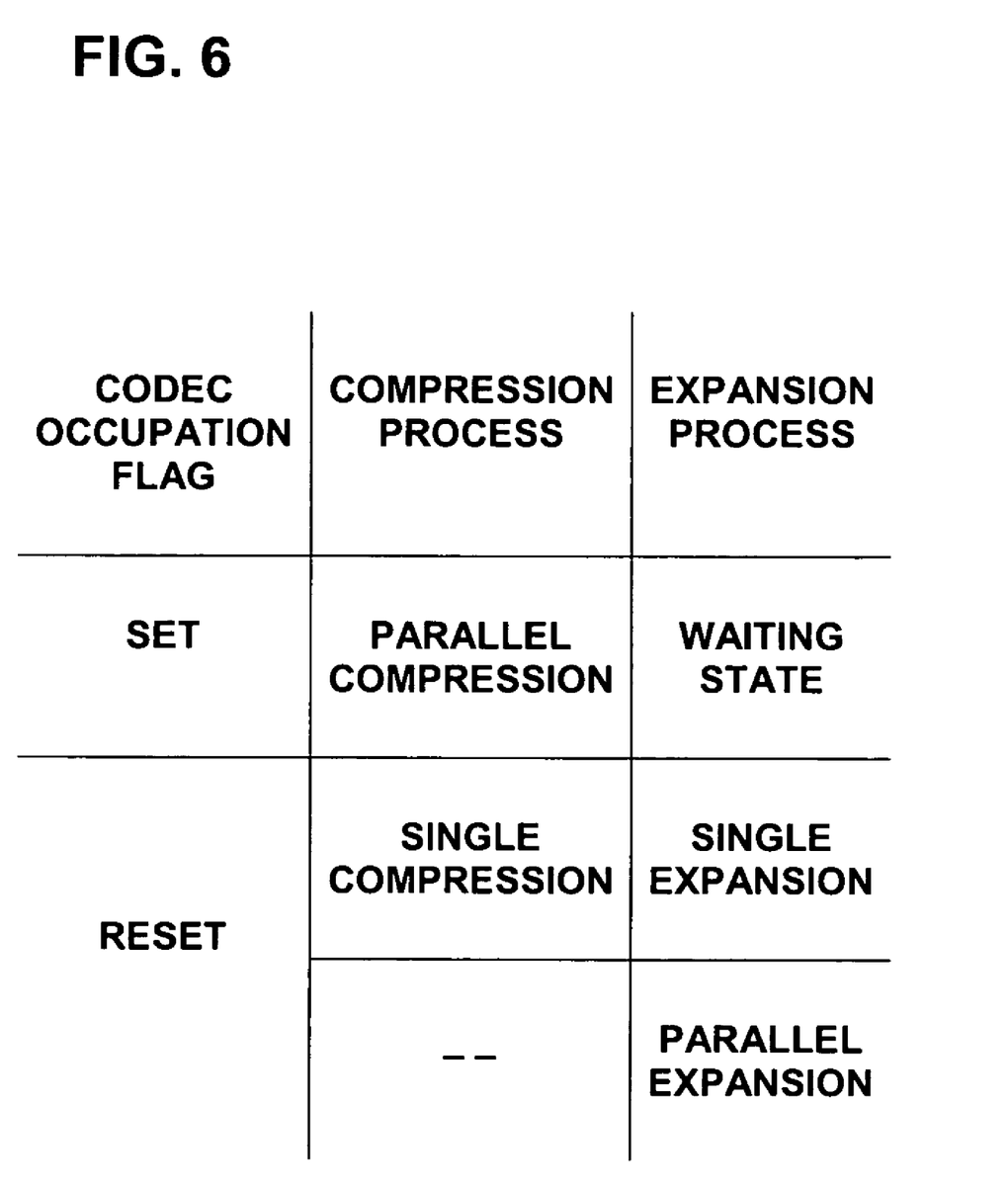
FIG. 6 is a chart illustrating the compression process and expansion process performed by the image signal processing apparatus of the present invention when the occupation flag is set or reset.

Referring to FIG. 6, it will be seen that the image signal processing apparatus of the present invention will perform a single compression or a parallel compression during the compression process when the codec occupation flag F is either set or reset, and that the apparatus of the present invention will perform a single expansion or a parallel expansion, or will be in a waiting state, during the expansion process when the codec occupation flag F is either set or reset, as has been described previously herein.

As can be understood from the above description, a plurality of frames of image signals periodically input from the multiplexer 12 frame by frame are recorded on the hard disk 34 in the compressed state. Furthermore, a plurality of frames of compressed image signals reproduced from the hard disk 34 are periodically output to the monitor 14 frame by frame in the expanded state. Herein, each of the JPEG codecs 26a and 26b selectively executes individual compression of the plurality of frames of image signals and individual expansion of the plurality of frames of the compressed image signals. The CPU 28 makes the JPEG codecs 26a and 26b perform the compression process prior to the expansion process.

Since both of the compression process and the expansion process are according to the JPEG format, it is not required that adjacent two frames are successively processed. Therefore, it is possible to perform in parallel the compression process and the expansion process. Furthermore, the compression process is executed prior to the expansion process, and therefore, a frame lacking never occurs to the compressed image signals to be recorded.

It is noted that although the multiplexer 12 according to this embodiment selects image signals output from the surveillance cameras c1 to c8 frame by frame, the image signals may be selected field by field. In this case, processing of the hard disk recorder 16 is executed in fields.

Furthermore, although the D-I/F 18 and the video output circuit 36 are prepared one by one, each of the circuits may be prepared in plurality. Where M of the D-I/Fs 18 are prepared, image signals to be recorded are periodically input every M frames, and where N of the video output circuits 36 are prepared, the image signals to be reproduced are periodically output every N frames.

In addition, although a hard disk is adopted as a recording medium in this embodiment, a magneto optical disk may be adopted in place of this.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus which records onto a recording medium in a compressed state a plurality of images periodically input and periodically outputs a plurality of compressed images reproduced from said recording medium in an expanded state, comprising:
   a plurality of codecs each of which executes an image compression process and an image expansion process;
   a compression instructor for instructing at least one codec in art available state out of said plurality of codecs to execute the image compression process;
   an expansion instructor for instructing at least one codec in the available state out of said plurality of codecs to execute the image expansion process;
   a determiner for determining whether or not a predetermined condition is satisfied;
   an occupant for occupying said plurality of codecs for said compression instructor when a determination result of said determiner is affirmative; and
   a canceller for canceling an occupation state of said occupant on at least one of said plurality of codecs when the determination result of said determiner is negative, wherein the expansion instructor waits to issue an instruction in response to an occupation process of said occupant and issues the instruction at a time of said canceller canceling the occupation state;

wherein the image processing apparatus makes a parallel expansion process performable when more than one codec of the plurality of codecs are in the available state, and wherein the image processing apparatus performs a single expansion process when only one codec of the plurality of codecs is in the available state.

2. An image processing apparatus according to claim 1, wherein said compression instructor repeatedly issues an instruction taking notice of the same image until a size condition is satisfied.

3. A surveillance camera system provided with an image processing apparatus according to claim 2.

4. An image processing apparatus according to claim 1, further comprising a memory for temporarily storing the input image, wherein the predetermined condition includes a first condition that a plurality of images are waiting for the image compression process in said memory.

5. A surveillance camera system provided with an image processing apparatus according to claim 4.

6. An image processing apparatus according to claim 1, wherein the predetermined condition includes a second condition that the images greatly change between screens.

7. A surveillance camera system provided with an image processing apparatus according to claim 6.

8. A surveillance camera system provided with an image processing apparatus according to claim 1.

* * * * *